May 16, 1961 L. E. SCOTT 2,984,743

TRANSISTOR AUDIO AMPLIFIER

Filed Oct. 10, 1957

2 Sheets-Sheet 1

INVENTOR.
Leslie E. Scott

BY R. E. Fowler

ATTORNEY

TRANSISTOR AUDIO AMPLIFIER

INVENTOR.
Leslie E. Scott
BY
R. C. Fowler
ATTORNEY.

United States Patent Office 2,984,743
Patented May 16, 1961

2,984,743

TRANSISTOR AUDIO AMPLIFIER

Leslie E. Scott, Kokomo, Ind., assignor to General Motors Corporation, Detroit, Mich., a corporation of Delaware Filed Oct. 10, 1957, Ser. No. 689,430

3 Claims. (Cl. 250—20)

Figures 1, 2:
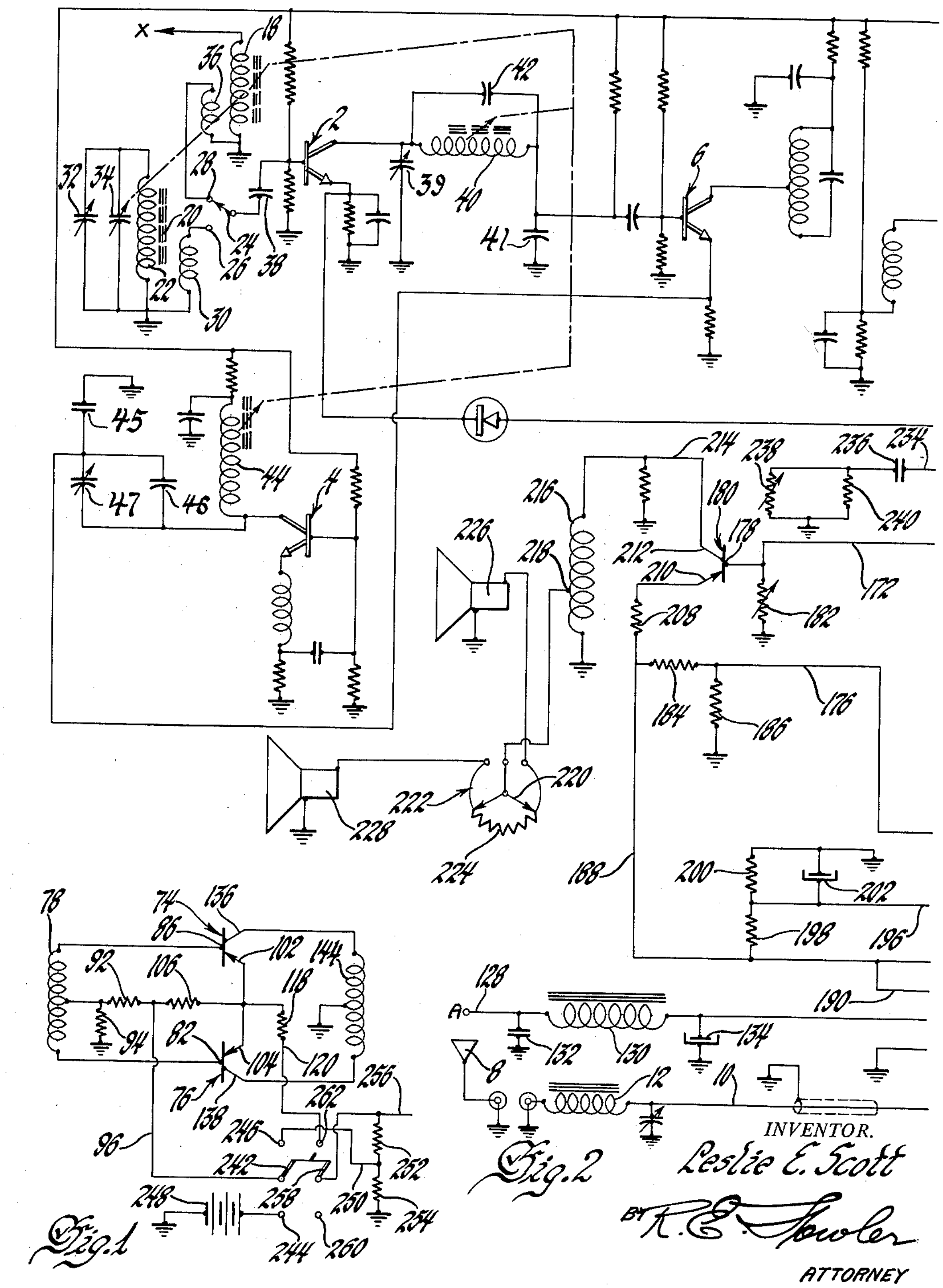

This invention relates to radio receiving apparatus and more particularly to a transistorized combination radio receiver which can be operated in a fixed installation in an automobile and also a portion or section of it removed and operated as an independent portable receiver.

Since the normal voltage available in an automobile is low, the use of transistors in radio apparatus particularly adapted for automotive use, is advantageous since the power pack to change the voltage to a higher voltage may be eliminated. In addition, transistors are more rugged than tubes, have a longer life, are of small size and less current drain. However, to date, the price of transistors has been high and in order to obtain a predetermined output for automobile use, a relatively large number of stages of transistor amplifiers are necessary. It is therefore essential to work each transistor efficiently.

In the present instance, the radio receiver consists of two separable units. The first, a section which is permanently mounted in the vehicle and the second, a removable section which can be operated as an independent portable receiver but which plugs into the first.

The section which remains in the vehicle includes the vehicle antenna, vehicle battery as a power supply, a permanently mounted speaker and a final audio amplifier stage. The section which is removable is a complete radio receiver in itself and includes a small enclosed independent antenna. In this instance it takes the form of a ferrite rod wound with an inductance. It also includes nine transistors which provide together with other components an RF amplifier, oscillator, IF amplifiers, detector, audio frequency amplifiers and a small portable speaker. This unit can be taken from the car and played independently on its own battery source. However, when it is plugged into the car set, a number of connections are made and switches actuated to cut out the independent power source, portable speaker and antenna and connect to their counterparts in the vehicle. Since as previously mentioned, transistors must be utilized efficiently, and since the amount of power available from the car battery, and from the separate portable dry cell are at wide variance, it would be most appropriate to operate the push-pull stage of audio amplification which feeds the portable speaker as a different class amplifier under the two separate phases of operation.

It is therefore an object in making this invention to provide means for operating an amplifier section of the receiver as different class operation when operated as a portable from that when it operates as an automobile radio receiver.

It is a further object in making this invention to provide a push-pull transistorized amplifier section which operates as a class B amplifier during one type of operation and is automatically switched to operate as a class A amplifier during another type of operation.

It is a still further object in making this invention to provide a transistorized push-pull audio amplifier stage which operates as a class B amplifier when powered by a small portable battery for maximum economy and which is automatically switched to operate as a class A amplifier when plugged into the permanent installation in a vehicle in order to provide most gain.

Figure 2A:
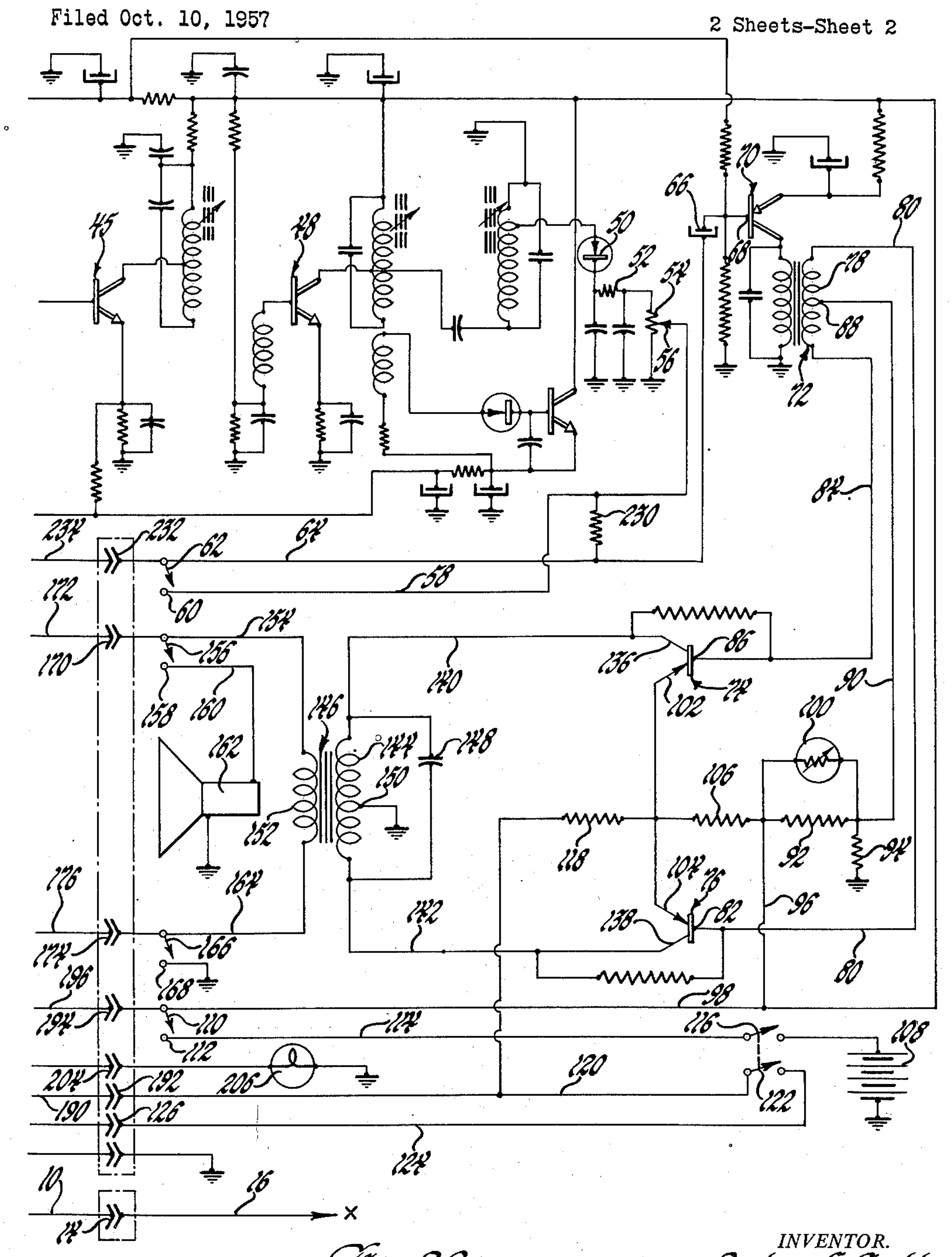

With the above and other objects in view which will be apparent as the specification proceeds, my invention will be better understood by reference to the following specification and claims and the illustrations of the accompanying drawings; in which:

Fig. 1 is a circuit diagram showing an amplifier section embodying my invention; and Figs. 2 and 2A form composite parts of a portable-automobile radio receiver in which my invention is embodied.

Referring now more particularly to Figure 2, this figure shows the radio frequency amplifier, oscillator and mixer stages which include, respectively, the transistors 2, 4 and 6. The antenna on the vehicle is illustrated at 8 and is connected to conductor 10 within the vehicle through a choke coil 12. Inasmuch as the vehicle antenna is only utilized by the receiver when the portable section is inserted into the aperture in the car, a disconnect switch 14 is provided, one-half of which is connected to line 10 and the other half to line 16 which extends to the antenna coil 18 to introduce the signal to this coil when the set is in the car. On the other hand, when the set is being operated as a portable, the antenna takes the form of a ferrite rod 20 upon which is wound an inductance coil 22 which forms a part of the resonant circuit for the radio frequency amplifier stage. As well as a plurality of connections between the detachable section and the remainder of the unit, there are also provided a number of switches which are thrown from one position to the other when the set is inserted into or withdrawn from the aperture in the car. One of these switches, actuated by such insertion, is switch 24 which connects either the automobile antenna or the portable antenna to the input of the radio frequency amplifier. The movable arm of switch 24 oscillates between two fixed contacts 26 and 28 and when the arm is in the lower position, the portable input is utilized and when in the upper position the car antenna input. Contact 26 is connected to ground through a coupling coil 30 having an inductive coupling with the antenna coil 22. An adjustable condenser 32 is connected across the antenna coil 22 in shunt to the tuning condenser 34. Adjustment of the condenser 32 determines the frequency range for the resonant circuit and movement of the variable condenser 34 tunes the resonant circuit over the desired band.

The input from the vehicle antenna is fed through tunable inductance coil 18 which has associated therewith a movable iron core and which is tuned by movement of the iron core with respect to the coil. A coupling coil 36 connected between switch contact 28 and ground, and inductively associated with such tuning coil 18, couples the incoming signal. The switch arm 24 is capacitatively coupled through condenser 38 to the input of radio frequency amplifier 2. This stage is coupled through a tunable resonant circuit including an inductance 40 whose valve may be varied by movement of an associated iron core for tuning purposes. A condenser 42 is connected in shunt to the coil 40 and these elements, along with condensers 39 and 41 comprise a conventional Pi type tuning circuit which determines the resonant frequency of the coupling. The output of this resonant circuit is coupled to the input of the mixer stage including transistor 6 in which stage the amplified radio frequency currents are mixed with the output of the tunable oscillator.

The tunable oscillator includes that circuitry associated with transistor 4 which incorporates a third tunable inductance 44 and its associated condensers 45, 46 and 47 which determine the resonant frequency of the oscillator. The oscillator is tuned by moving an associated core in coil 44 to change the inductance thereof. The dash-and-dot lines coupling the tuning means for the coils 18, 40 and 44 indicate that all three of these elements are simultaneously tuned to tune the receiver. Thus, when the switch 24 is in the position shown and the antenna for the vehicle is used, the receiver is a straight permeability tuned set, and the tuning is provided by the simultaneous movement of the cores associated with these three coils. However, when the switch 24 is thrown to the other position and the set is being operated as a portable receiver, the ferrite rod antenna appears as an inductance and it is therefore necessary to utilize a variable condenser therewith for tuning purposes. Therefore, condenser 34 is also mechanically connected to move at a programmed rate with the cores and when on portable operation it tunes the antenna circuit whereas the simultaneous movement of the cores associated with coils 40 and 44 continue to tune the radio frequency and oscillator circuits.

The output of the mixer stage is a resultant of the combined outputs of the radio frequency amplifier and the oscillator and this is fed into two stages of intermediate frequency amplification which include the transistors 45 and 48 and their associated circuitry. Thus the intermediate frequency signal is amplified. This signal is applied to the detector which is a diode 50 and the output of this diode develops an audio frequency signal across resistances 52 and 54 in series to ground from the rectifier.

The rectified audio frequency signal is taken off through the adjustable tap 56 on the resistor 54 which acts as a volume control and is applied through line 58 to stationary contact 60 of one of the switches which is actuated when the portable section is applied to the permanent installation in the vehicle. Movable arm 62 which engages stationary contact 60 in one position is connected through line 64 to a coupling condenser 66 and through that to the base electrode 68 of transistor 70 which operates as the first stage of audio amplification. The output of transistor 70 is fed through coupling transformer 72 to a push-pull amplification stage including transistors 74 and 76. This push-pull amplifier stage is novel in that it is so connected as to operate as a class B amplifier when operating as a portable receiver but switched to a class A amplifier when operating as an automobile receiver when in the car. The specific circuitry therefore will be described.

The secondary winding 78 of the transformer 72 has one terminal connected through line 80 with the base electrode 82 of the transistor 76. In like manner the opposite terminal of the secondary winding 78 is connected through line 84 with the base 86 of the transistor 74. A center tap 88 on the winding 78 is coupled through line 90 to a point intermediate two resistances 92 and 94 which are connected in series and form a part of a voltage divider. This voltage divider fixes the operating point or bias at which transistors 74 and 76 function. The remote terminal of resistance 94 is grounded and the remaining terminal of resistance 92 is connected through tieline 96 to low voltage power line 98. Line 96 therefore applies power to the transistor circuit. A thermistor 100 is connected in shunt to resistance 92 to stabilize the circuit for temperature change. Emitter electrodes 102 and 104 of the transistors 74 and 76 respectively are directly connected together and through resistor 106 to the power supply line 96. The low voltage power line 98 is connected to the battery source 108 through switch arm 110 connected thereto which is associated with a stationary contact 112, which switch arm 110 is actuated upon the insertion of the portable section. Stationary contact 112 is in turn connected through tieline 114 to on-off switch 116 and thence to one pole of the battery 108. It will thus be obvious that when switch 116 is closed, and switch 110 also, power line 98 will have applied thereto the voltage of the portable battery.

The emitters 102 and 104 of the transistors are also connected through resistance 118 to power supply line 120. This line receives the higher voltage power from the vehicle battery through a second on-off switch 122 ganged with switch 116 and closed simultaneously. Switch 122 is likewise connected to power line 124 and thence through a disconnect switch 126 with the A battery line 128 through a filter choke section including choke coil 130 and condensers 132 and 134. The collector electrodes 136 and 138 of the transistors 74 and 76 are connected through lines 140 and 142 to opposite terminals of the primary winding 144 of audio frequency transformer 146. A condenser 148 is connected in shunt to the primary winding 144 and a center tap 150 on said winding is grounded. A secondary winding 152 of transformer 146 has one terminal connected through line 154 to switch arm 156 which cooperates with stationary contact 158 in turn connected through line 160 to the voice coil of a loud speaker 162. The opposite terminal of the speaker coil is connected to ground. The other terminal of the secondary winding 152 is connected through line 164 to a switch arm 166 which is engageable with a stationary contact 168 which is grounded. When switch arms 156 and 166 engage their respective contacts, secondary winding 152 is coupled to the speaker to reproduce sound.

On the other hand when the portable section is inserted in the instrument panel, the action of insertion opens both of the switches, disconnecting the speaker and simultaneously completing circuits to the fixed amplifier final stage mounted in the car. Line 154 is therefore connected through disconnect switch 170 to line 172 and in like manner line 164 through disconnect switch 174 to line 176 in the fixed installation. Line 172 is connected directly to the base electrode 178 of transistor 180 which forms the final audio amplifier stage for the combination car receiver. Line 172 is also connected to ground through variable resistance 182. Line 176 from the other side of the transformer secondary winding 152 is connected to a point intermediate two series resistors 184 and 186 which form a portion of a voltage divider providing essential bias voltages for this stage. The remaining terminal of resistor 186 is grounded and the remote terminal of resistance 184 connected to line 188 which is supplied with power from the vehicle battery since it is connected to line 120 through tieline 190 and disconnect switch 192. Line 98 in the portable section is likewise connected through disconnect switch 194 to line 196 which extends to a point intermediate resistors 198 and 200 connected in series between line 188 and ground. A condenser 202 is connected in shunt to resistance 200. Line 188 is connected through disconnect switch 204 to one terminal of an indicating lamp 206 in the removable portion, the opposite terminal of which is grounded. This lamp is energized only when the set is in the car and indicates a completion of the proper circuits for operation in that location. Line 188 is lastly connected through resistor 208 to the emitter electrode 210 of the transistor 180. The output of the secondary winding 152 which forms a coupling transformer when in the car is thus applied across the base and emitter electrodes of the final audio amplifier stage.

The collector electrode 212 of the transistor 180 applies the output of this stage to the speakers and this is accomplished through the connection of said collector electrode through line 214 to one terminal of auto transformer winding 216, the opposite terminal of which is grounded. An intermediate tap 218 on this winding is connected to adjustable switch arms 220 of a fader control 222. These arms move over a variable resistance 224, one terminal of which is connected to a loud speaker 226 which may be located in the instrument panel and the other terminal to a second loud speaker 228 which may be mounted at some remote location. Thus by moving the arm 220, one speaker can be brought in and the other faded out as desired.

As far as tone control is concerned, it is fixed by components in circuit when line 58 is connected with the line 64 and the set is operated as a portable and cannot be varied. However, when the portable section is inserted in the car disconnect switch 232 connects line 64 and resistance 230 to line 234 which is in turn connected to the tone control section. This includes a series condenser 236 and two parallel resistors 238 and 240 connected between one terminal of the condenser 236 and ground. Resistance 238 is variable and its adjustment changes tonal response which is effective when the set is operated as an automobile receiver.

Referring to Figure 1, this figure diagrammatically illustrates the connections associated with the push-pull amplifier section of transistors 74 and 76, and it will be used to describe the theory of operation and the change from class B to class A operation by switching. In Figure 1, therefore, like reference characters will be used to describe like parts, and in that case the secondary winding 78 is shown at the left of Figure 1 which is the input to the push-pull amplifier stage and it is, as before, connected across the base electrodes 86 and 82 of the transistors 74 and 76. The emitter electrodes 102 and 104 are shown connected together and resistances 92 and 94 act as the voltage divider from low voltage power line 96. Collector electrodes 136 and 138 apply the output to the primary audio transformer winding 144. Resistor 118 connected between the emitters 102 and 104 and high voltage line 120 provides an increased bias to transistors 74 and 76. Resistor 106 protects against excessive transistor currents that would be experienced at elevated temperatures, and it is not primarily a biasing device.

To illustrate the theory, low voltage line 96 is shown connected to one pole 242 of a double pole double throw switch. This pole is engageable alternately with stationary contact 244 or 246 depending upon which way the switch is thrown. Stationary contact 244 is connected to a low voltage battery source 248. Stationary contact 246 on the other hand, is connected through line 250 to a point intermediate two resistors 252 and 254 which act as a voltage divider between power line 256 and ground. Power line 256 is connected directly to the second movable pole 258 of the switch which is engageable with stationary contact 260 which is unconnected and also with contact 262 which is connected to power line 120.

The values of the resistances 92 and 94 are selected so that when the stage is operating as a portable and supplied only from the low voltage battery it is operating as a class B amplifier with minimum distortion. Class B operation is of course preferable in this instance because of the lower power drain and better economy. Simulating operation as a portable, in Figure 1, the switch 242—258 would be down, directly connecting the battery 248 to the line 96.

The transistors 74 and 76 are PNP transistors. The current flow through these can be increased in either one of two ways, either by lowering the voltage of the base or increasing the voltage of the emitters. In the current instance, the emitter voltage is increased to increase the current flow and this is accomplished by applying a higher voltage to said emitters through this circuit. With the switch 242—258 in the upper position, therefore, 6 volts is still applied to the line 96 from the tap between resistances 252 and 254 but the higher voltage of line 256 is applied to line 120 which increases the emitter voltage. The value of the resistance 118 is chosen so that the stage will now operate as a class A amplifier.

With the removable section operating as a portable receiver which includes everything to the right and above the dash and dotted line enclosure indicating the disconnect board, all of the disconnect switches are of course open and switch arms 62, 156, 166 and 110 are all closed by the removal of the portable unit. This action also moves switch arm 24 to its lower position in contact with stationary contact 26. This circuit now includes the ferrite rod as the antenna. Closure of arm 62 on its associated contact completes the input to the first audio amplifier. Closure of switch arms 156 and 166 complete an obvious circuit to the portable speaker and closure of switch 110 completes a power supply circuit from the battery 108 to the set. The receiver now operates as a self-contained unit receiving signals on the ferrite antenna 22, amplifying the same and applying the amplified signals to the loud speaker 162. The receiver is of course energized by closure of the on-off switch 116 which may be operated by any suitable button on the set.

If the operator now desires to replace the set within the vehicle compartment, he does so and presses the set firmly against the back wall at which time it engages a series of contacts to complete the disconnect switches and at the same time move the switch arms just described. Switch arm 24 would be moved to its upper position by this action and switch arms 62, 156, 166 and 110 would be opened. By moving the switch arm 24 to its upper position, the input circuit to the radio frequency amplifier 2 is now connected to the vehicle antenna through an obvious circuit and signals received by that antenna are now impressed on the set. Opening of switch arm 62 and closing of disconnect switch 232 now causes the inclusion of tone control means 238, 240, 236 and 230 in the circuit between the volume control and the input to the first audio amplifier. The tone may thus now be varied when the set is in the car. Opening of switch arms 156 and 166 disconnects the portable speaker from the set and simultaneously connects the secondary winding 152 to the input circuit of the last audio amplifier 180. Opening of the switch arm 110 disconnects the portable battery 108 from the set and the making of various disconnect switches 204, 192 and 126 now connect the vehicle battery source 128 to the set for operation and the vehicle antenna to its resonant circuit. At this time also, a voltage is applied to the lamp 206 to indicate that the set is now energized from the vehicle power source. In this instance, of course, the radio set is energized by the on-off switch 122 which operates simultaneously with on-off switch 116 closing whichever power circuit is actuable.

I claim:

1. In amplifying means, at least one transistor having a base, emitter and collector electrodes, an input circuit connected to said base and emitter electrodes, an output circuit connected to said collector electrode, a plurality of sources of electrical power of different voltage, biasing means connected to the emitter electrode to properly bias the same and a plurality of switching means each connected between one of the sources of electrical power and different points of connection in the biasing means connected to the emitter electrode so that the bias applied to the emitter electrode differs depending upon which source of power is utilized and the amplifying stage will operate either as a class A or as a class B amplifier.

2. In amplifying means, a pair of PNP transistors having base, emitter and collector electrodes, said emitters being connected directly together, an output circuit connected to said collectors, an input circuit connected to the bases, biasing means connected to said emitters to provide operating bias voltages thereon, a first low voltage source of electrical power, a first switching means interconnecting said first low voltage source of electrical power to one point of connection in said biasing means to apply a first set of operating potentials, a second higher voltage source of electrical power, a second switching means interconnecting said second power source to a second point of connection in said biasing means to provide a second set of operating potentials to said amplifier for a different type of operation.

3. In combination, radio receiving apparatus, a first separable section including an antenna, radio frequency amplifying means, detecting means, a low voltage power source and a loud speaker, audio frequency amplifying means interconnecting said detector means and the loud speaker, biasing means connected to the low voltage power source and to said audio frequency amplifying means, a second section including a second larger loud speaker, a second higher voltage source of electrical power and a second antenna, switching means actuated by the joining of the first and second sections to switch from the first named antenna, source of electrical power and loud speaker to the second named, and further switching means connecting said second higher voltage source of electrical power to a different point in said biasing means for said audio frequency amplifying means from that to which the low voltage power source is connected to develop a different bias when said further switching means is actuated to change the bias thereon and cause it to operate as a class A amplifier when driving the second larger loud speaker.

References Cited in the file of this patent

UNITED STATES PATENTS

| | | |
|---|---|---|
| 2,273,709 | Jones | Feb. 17, 1942 |
| 2,361,953 | McDonald | Nov. 7, 1944 |
| 2,505,115 | Hills | Apr. 25, 1950 |
| 2,662,975 | Schwarz | Dec. 15, 1953 |
| 2,751,550 | Chase | June 19, 1956 |
| 2,790,899 | Townsend | Apr. 30, 1957 |
| 2,812,393 | Patrick | Nov. 5, 1957 |
| 2,866,859 | Stanley | Dec. 30, 1958 |